(12) United States Patent
Niitsuma et al.

(10) Patent No.: US 10,039,273 B2
(45) Date of Patent: Aug. 7, 2018

(54) SPOOL BRAKE DEVICE FOR DUAL-BEARING REEL

(71) Applicant: Shimano Inc., Sakai, Osaka (JP)

(72) Inventors: Akira Niitsuma, Osaka (JP); Tetsuya Matsumoto, Osaka (JP)

(73) Assignee: SHIMANO INC., Sakai, Osaka (JP)

( * ) Notice: Subject to any disclaimer, the term of this patent is extended or adjusted under 35 U.S.C. 154(b) by 467 days.

(21) Appl. No.: 14/994,037

(22) Filed: Jan. 12, 2016

(65) Prior Publication Data

US 2016/0212981 A1    Jul. 28, 2016

(30) Foreign Application Priority Data

Jan. 28, 2015  (JP) ................................ 2015-014241

(51) Int. Cl.
*A01K 89/01*    (2006.01)
*A01K 89/0155*  (2006.01)

(52) U.S. Cl.
CPC .............................. *A01K 89/01556* (2015.05)

(58) Field of Classification Search
CPC .......... A01K 89/0155; A01K 89/01556; A01K 89/033
See application file for complete search history.

(56) References Cited

U.S. PATENT DOCUMENTS

| 2004/0148843 | A1* | 8/2004 | Ikuta | A01K 89/01555 43/21 |
| 2009/0166459 | A1* | 7/2009 | Niitsuma | A01K 89/01555 242/287 |
| 2013/0037645 | A1* | 2/2013 | Niitsuma | A01K 89/01555 242/288 |
| 2014/0110516 | A1* | 4/2014 | Niitsuma | A01K 89/01555 242/288 |
| 2014/0110517 | A1* | 4/2014 | Niitsuma | A01K 89/01555 242/288 |

FOREIGN PATENT DOCUMENTS

JP    5122273 B2    1/2013

* cited by examiner

*Primary Examiner* — Emmanuel M Marcelo
(74) *Attorney, Agent, or Firm* — United IP Counselors, LLC

(57) ABSTRACT

A method for a dual-bearing reel includes detecting a rotational speed of a spool rotatably mounted to a reel unit, a fishing line to be wound about the spool, controlling a spool brake to brake the spool with a first braking force when a detected tension that acts on the fishing line is equal to a reference tension controlling the spool brake to brake the spool with a braking force obtained by correcting the first braking force based on a second braking force when the detected tension and the reference tension are different from each other, the second braking force positively or negatively correcting the first braking force by increasing or decreasing the first braking force, and performing a decrease processing of decreasing the second braking force with the elapse of time when the second braking force has been determined to fluctuate with a predetermined amplitude or greater.

20 Claims, 12 Drawing Sheets

| | x | y1 | y2 | y3 |
|---|---|---|---|---|
| AUTOMATIC F | 250 | 25 | −6 | 25 |
| AUTOMATIC N | 100 | 25 | 2 | 25 |
| AUTOMATIC PE | 100 | 25 | −2 | 25 |

SPOOL BRAKE DEVICE FOR DUAL-BEARING REEL

CROSS-REFERENCE TO RELATED APPLICATIONS

This application is based upon and claims the benefit of priority to Japanese Patent Application No. 2015-014241, filed on Jan. 28, 2015, the entire contents of which are incorporated herein by reference.

BACKGROUND

Technical Field

The present specification relates to a brake device, particularly a spool brake device for a dual-bearing reel, configured to brake a spool rotatably mounted to a reel unit.

Background Information

Dual-bearing reels, particularly bait casting reels for casting with a terminal tackle (e.g., a lure) attached to the tip of a fishing line, are equipped with a spool brake device configured to brake a spool in order to prevent an occurrence of backlash in casting. Among the spool brake devices of this type, some have been developed such that a braking force acting on the spool is electrically controllable (see e.g., Japan Patent No. 5122273).

In the well-known spool brake device, a power generating mechanism including coils and magnets is mounted between the spool and the reel unit. The power generating mechanism is configured to be electrically controlled for regulating a braking force in the course of casting. When a detected tension becomes a preliminarily-set reference tension or less, the well-known spool brake device is configured to brake the spool with a braking force obtained by adding a second braking force to a first braking force. The second braking force is herein set based on the first braking force. In this configuration, when a relatively strong tension is constantly applied, the detected tension exceeds the reference tension at a high frequency, and this increases the chances of braking the spool only with the first braking force which is relatively weak. Due to this, when a heavy terminal tackle is used or when fishing is carried out in a tailwind condition, for instance, the spool is configured to be braked with the weak braking force. On the other hand, when a weak tension is applied, the detected tension becomes the reference tension or less at a high frequency, and this increases the chances of braking the spool with the second braking force which is relatively strong. Due to this, when a light terminal tackle is used or when fishing is carried out in a headwind condition, for instance, the spool is configured to be braked with the strong braking force. With the aforementioned configurations, the spool can be appropriately braked without minutely regulating the braking force in accordance with the weight of the terminal tackle, the wind direction in a fishing site, and so forth.

When fishing is carried out with a heavy terminal tackle, the well-known spool brake device poses a risk that the second braking force to be added to the first braking force repeatedly increases and decreases in a short period of time, and this could result in the flipping of a fishing rod.

BRIEF SUMMARY

It is an object of the present specification to prevent the second braking force from repeatedly increasing and decreasing in a short period of time.

A spool brake device for a dual-bearing reel according to the present specification is a device configured to brake a spool that is rotatably mounted to a reel unit on as to be capable of winding a fishing line thereabout. The spool brake device for a dual-bearing reel includes a spool brake, a first braking force setter, a speed detector, a tension setter, a tension detector, a second braking force setter and a spool controller The spool brake is configured to brake the spool in an electrically controllable manner. The first braking force setter is configured to set a first braking force. The speed detector is configured to detect a rotational speed of the spool. The tension setter is configured to set a reference tension. The tension detector is configured to detect a tension acting on the fishing line. The second braking force setter is configured to set a second braking force that is used for positively or negatively correcting the first braking force by increasing or decreasing the first braking force. The spool controller is configured to control the spool brake with the first braking force When a detected tension detected by the tension detector and the reference tension are equal to each other, and is configured to control the spool brake with a braking force obtained by correcting the first braking force based on the second braking force when the detected tension and the reference tension are different from each other. The spool controller is configured to perform a decrease processing of decreasing the second braking force with the elapse of time when determining that the second braking force has fluctuated with a predetermined amplitude or greater.

In the present spool brake device, when the set reference tension and the detected tension detected by the tension detector are different from each other, the first braking force is corrected by increasing or decreasing the first braking force based on the second braking force. Thus, a braking force greater than or less than the first braking force is obtained anew. At this time, when determining that the second braking force has fluctuated with a predetermined amplitude or greater, the spool controller is configured to decrease the second braking force with the elapse of time. With the decrease processing, the fluctuation range of the detected tension is narrowed, and this results in resolution of fluctuation in the second braking force. Consequently, the second braking force can be prevented from repeatedly increasing and decreasing in a short period of time.

The tension detector can be configured to detect an extent of tightness of the fishing line and an extent of looseness of the fishing line as the tension based on variation in the rotational speed detected by the speed detector. In this case, it is possible to detect the extent of looseness of the fishing line attributed to line sag in addition to the extent of tightness of the fishing line attributed to pulling of the fishing line. Therefore, controlling in line sag can be performed quickly and accurately.

The spool controller can be configured to determine that the second braking force has fluctuated with the predetermined amplitude or greater when the following conditions are all satisfied: a first peak of the second braking force emerges after elapse of a predetermined period of time from starting of braking and is greater than a first predetermined braking force; a second peak of the second braking force emerges in an opposite direction to the first peak after emergence of the first peak and is less than a second predetermined braking force; and a third peak of the second braking force emerges in the same direction as the first peak after emergence of the second peak and is greater than a third predetermined braking force. In this case, it is possible to reliably detect fluctuation in the second braking force in a short period of time.

When the detected tension becomes a predetermined tension or less within a predetermined period of time during performing the decrease processing, the spool controller can be configured to finish performing the decrease processing. In this case, the tension is unlikely to be lowered.

The second braking force setter can be configured to set the second braking force based on a preliminarily-set maximum value of the second braking force, a preliminarily-set set tension differential between the reference tension and the detected tension, and a detected tension differential between the reference tension and the detected tension at a point of time when the detected tension has been detected by the tension detector. In this case, the second braking force is settable in accordance with the detected tension without being extremely increased.

Each of the first and second braking force setters can be configured to be capable of setting a plurality of magnitudes for each of the first and second braking forces such that the magnitudes are at least partially set differently in accordance with materials of the fishing line. The spool brake device for a dual-bearing reel can further include a first selector configured to select any one of a plurality of fishing line types made of different materials. In this case, the magnitude of each of the first and second braking forces can be changed in accordance with the fishing line types. Hence, the flying distance of a terminal tackle can be prolonged under the optimal condition depending on the conditions regarding the fishing line types.

Each of the first and second braking force setters can be configured to be capable of setting a plurality of different magnitudes for each of the first and second braking forces. The spool brake device can further include a second selector configured to select any one of combinations of the magnitudes of the first braking force and the magnitudes of the second braking force. In this case, the magnitude of each of the first and second braking forces can be changed in accordance with, for instance, the mass of the terminal tackle. Hence, the flying distance of the terminal tackle can be prolonged under the optimal condition depending on the conditions regarding the terminal tackle types or so forth.

The maximum value of the second braking force and the set tension differential can be set in accordance with at least either the fishing line type selected by the first selector or the combination selected by the second selector In this case, the maximum value of the second braking force and the set tension differential can be optimally set in accordance with at least either the selected fishing line type or the selected combination.

The second braking force setter can be configured to set the second braking force by multiplying the maximum value to a value obtained by dividing the detected tension differential by the set tension differential. In this case, the second braking force can be set without exceeding the maximum value thereof.

The spool controller can be configured to increase the second braking force with the elapse of time by decreasing the set tension differential with the elapse of time. In this case, the denominator in the formula for setting the second braking force decreases with the elapse of time. Hence, the second braking force can be rapidly increased with the elapse of time in an inverse proportional manner. Therefore, even when the fishing line is loosened, the loosened state can be quickly resolved.

The second braking force setter can be configured to increase the second braking force when a maximum rotational speed detected after casting is slower than a predetermined rotational speed. In this case, an occurrence of line sag can be prevented when casting is performed in a condition that the spool is rotated at a low speed in order to accurately put the terminal tackle in a short distance target.

Overall, according to the present specification, it is possible to prevent the second braking force from repeatedly increasing and decreasing in a short period of time.

BRIEF DESCRIPTION OF THE DRAWINGS

Referring now to the attached drawings which form a part of this original disclosure.

DETAILED DESCRIPTION OF EMBODIMENTS

Figure 1:
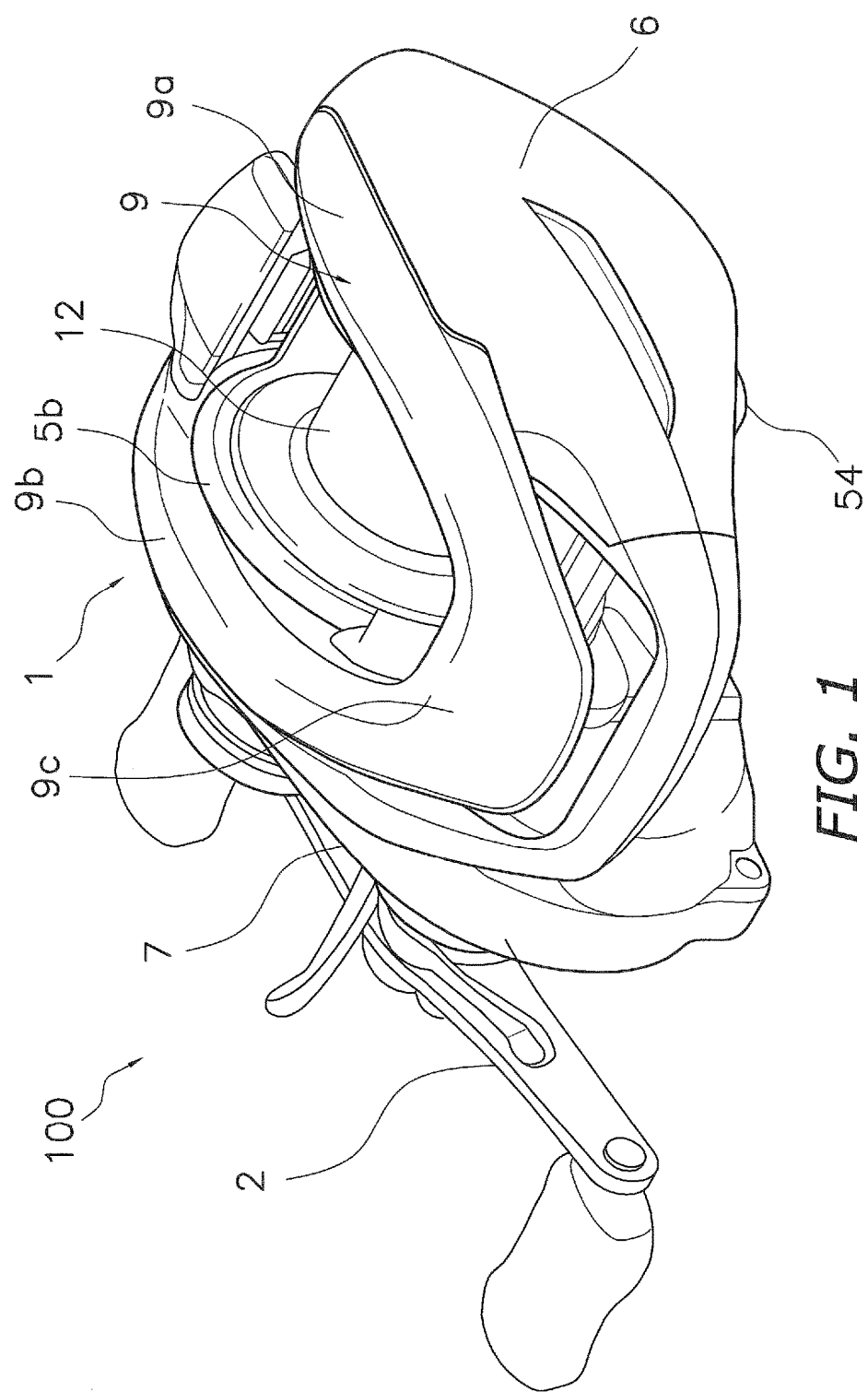
FIG. 1 is a perspective view of a dual-hearing reel employing a preferred embodiment of the present specification.
Figure 2:
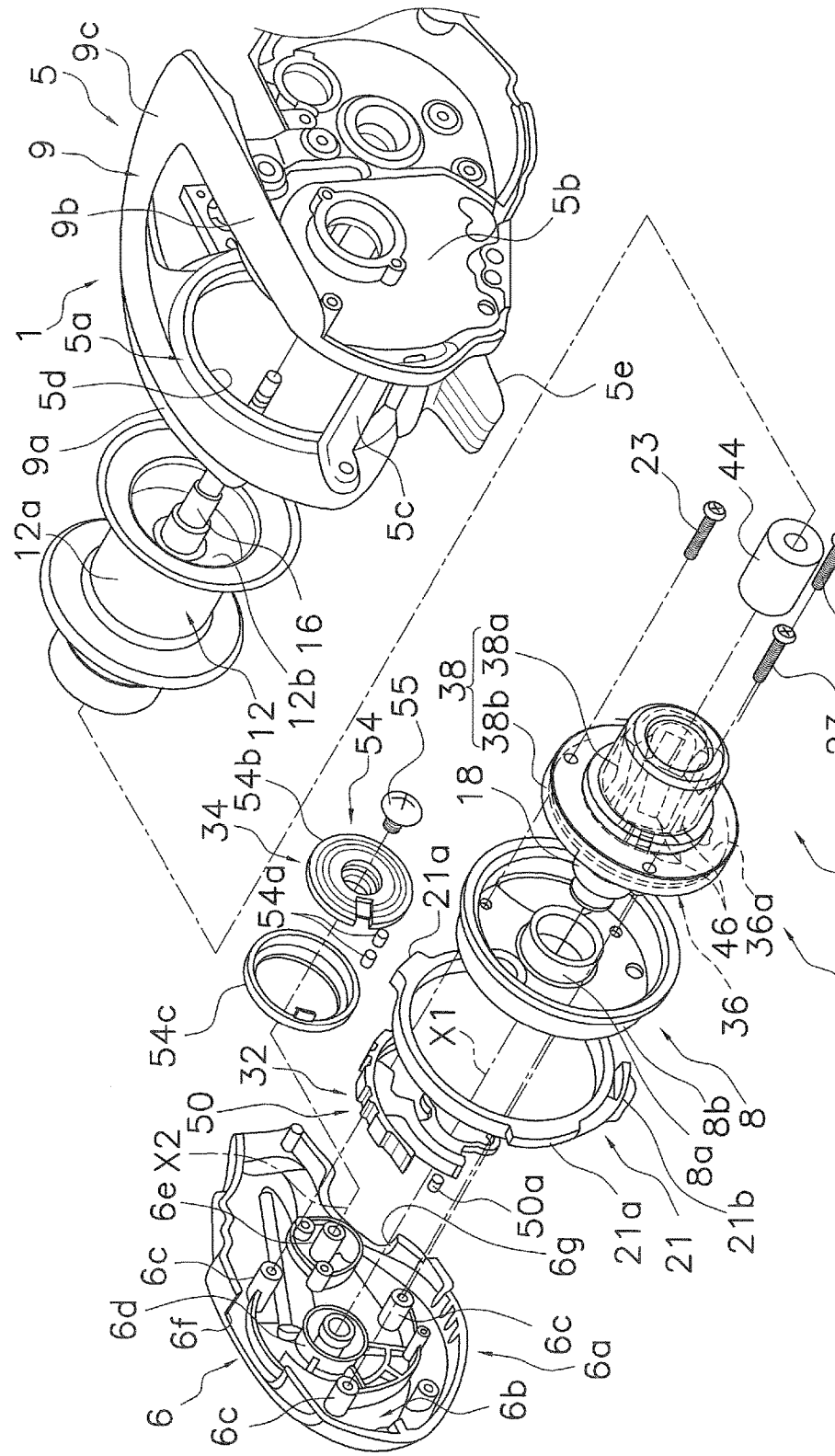
FIG. 2 is an exploded perspective view of the dual-bearing reel including a spool brake mechanism.

As shown in FIGS. 1 and 2, a dual-bearing reel 100 employing a preferred embodiment of the present specification includes a reel unit 1, a handle 2, a spool 12, and a spool brake mechanism 20 (see FIG. 2) configured to electrically brake the spool 12. The spool brake mechanism 20 is an exemplary spool brake device for the dual-bearing reel 100.

The reel unit I includes a frame 5, a first side cover 6 and a second side cover 7. The frame 5 is an integrally formed component. The first side cover 6 is disposed laterally to the frame 5 on the opposite side of the handle 2. The second side cover 7 is disposed laterally to the frame 5 on the same side as the handle 2.

As shown in FIG. 2, the frame 5 includes a first side plate 5a, a second side plate 5b, a plurality of coupling portions 5c, and a thumb rest 9. The first side plate 5a is disposed on the opposite side of the handle 2. The second side plate 5b is opposed to the first side plate 5a. The coupling portions 5c couple the first side plate 5a and the second side plate 5b. The first side plate 5a includes a circular opening 5d enabling the spool 12 to pass therethrough. Among the plural coupling portions 5c, the one coupling the first side plate 5a and the second side plate 5b on the bottom side is provided with a fishing rod attachment leg 5e to be attached to a fishing rod. The spool brake mechanism 20 is detachably mounted to a position about the opening 5d on the first side plate 5a of the frame 5. The first side cover 6 is detachably mounted to the first side plate 5a of the frame 5. The first side cover 6 includes a cover body 6a and a shaft support portion 8 mounted to an inner surface 6b of the cover body 6a.

A plurality of (e.g., three) fixation bosses 6c are provided on the inner surface 6b of the cover body 6a so as to fix the shaft support portion 8. Additionally, a first mount boss 6d and a second mount boss 6e are separately provided on the inner surface 6b so as to enable a first selector 32 (to be described) and a second selector 34 (to be described) of the spool brake mechanism 20 to be rotatably mounted thereto. The first mum boss 6d has a tubular shape formed about a first axis X1. The second mount boss 6e has a shape formed about a second axis X2 arranged in parallel to the first axis X1. The second axis X2 is arranged forward of the first axis X1 and adjacently to the fishing rod attachment leg 5e. The first axis X1 is arranged coaxially to a spool shaft 16 (to be described) in a condition that the cover body 6a is mounted to the first side plate 5a.

Figure 3:
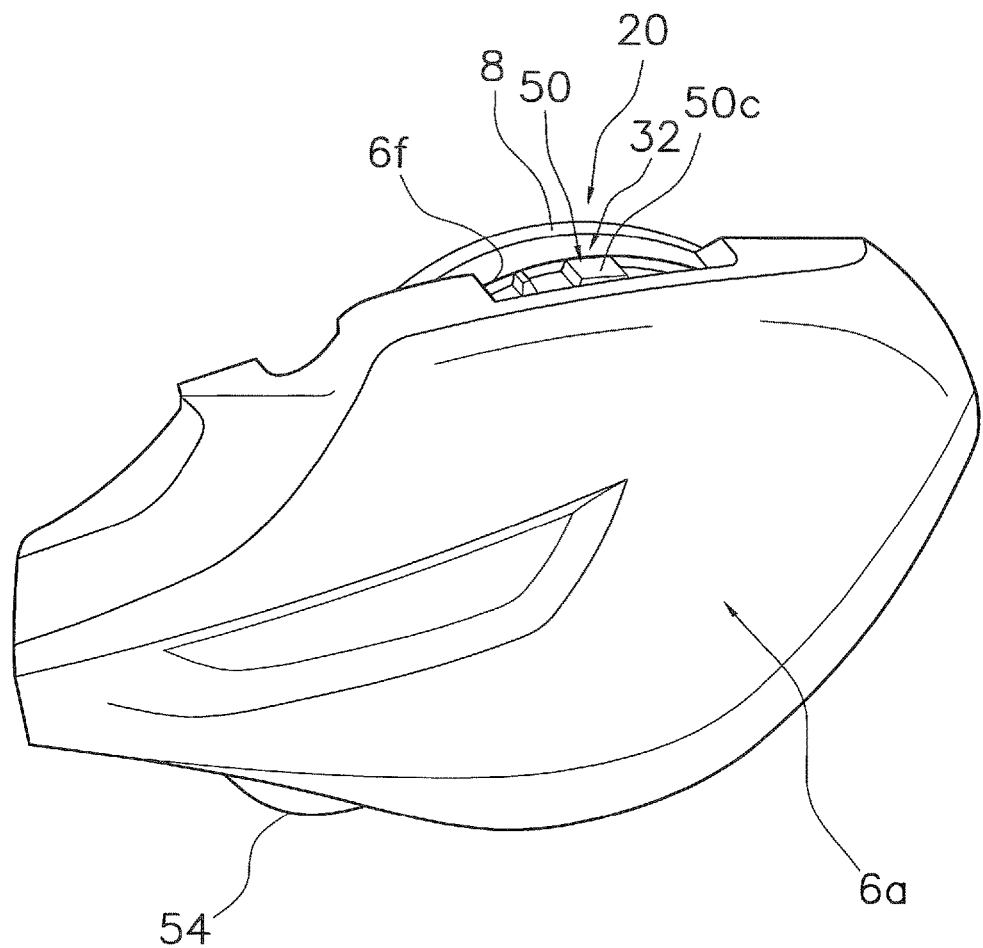
FIG. 3 is a perspective view of the spool brake mechanism.

The cover body 6a is disposed in contact with the thumb rest 9 and is covered with a first bulge 9a (to be described) of the thumb rest 9. The part of the cover body 6a, covered with the first bulge 9a, includes a first opened part 6f. The first opened part 6f has a rectangular shape and enables the first selector 32 to be exposed therethrough. Therefore, as shown in FIG. 3, the first selector 32 is inoperable unless the first side cover 6 is detached from the frame 5. The cover body 6a has a second opened part 6g below the second mount boss 6e. The second opened part 6g has a rectangular shape and enables the second selector 34 to outwardly protrude therethrough. Therefore, the second selector 34 is operable even when fishing is carried out.

Figure 4:
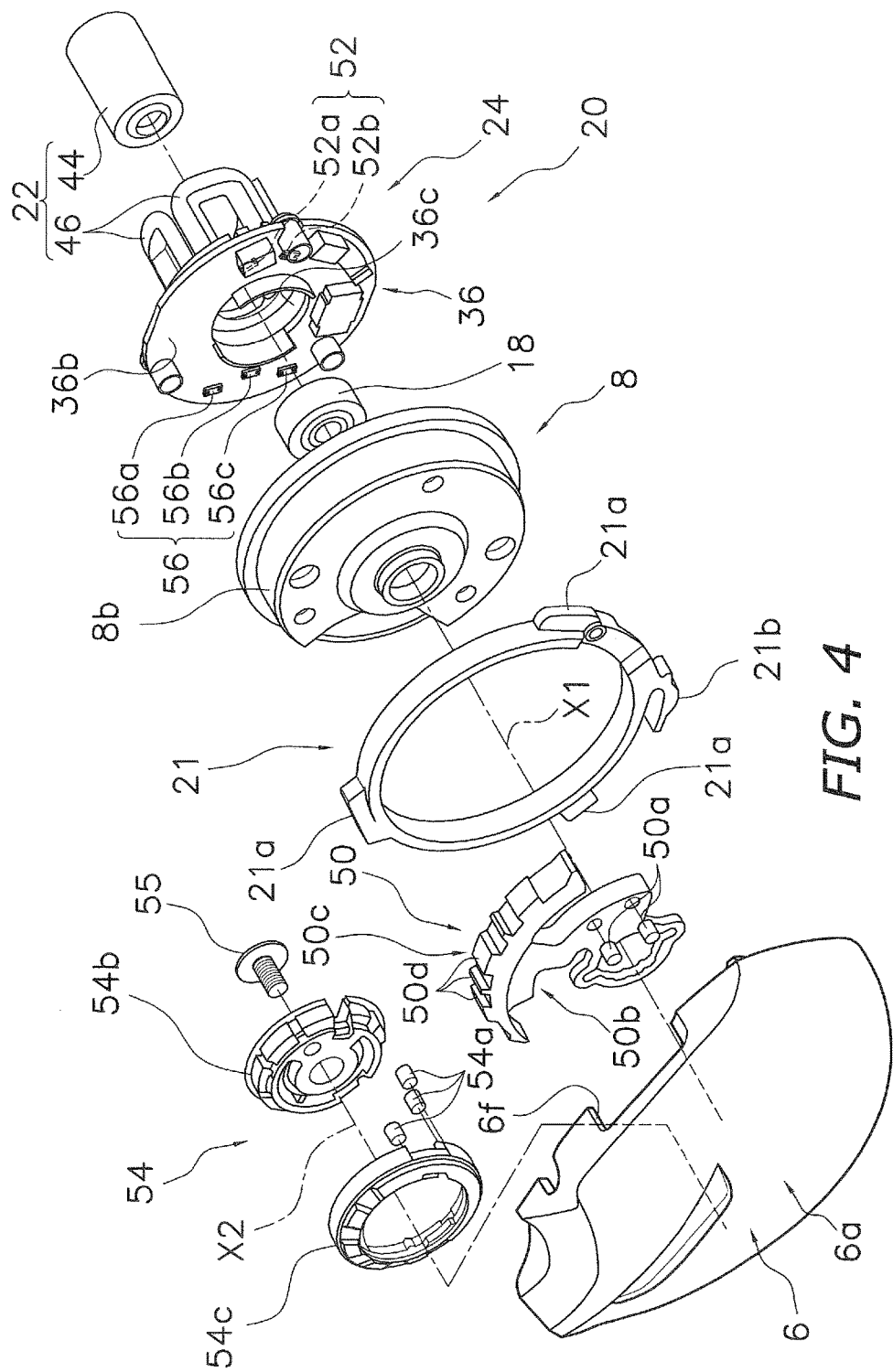
FIG. 4 is an exploded perspective view of the spool brake mechanism.

As shown in FIGS. 2 and 4, one end of the spool shaft 16 of the spool 12 is rotatably supported by the shaft support portion 8. The shaft support portion 8 is a flat cylindrical member having a partially closed end. The shaft support portion 8 includes a tubular bearing accommodation part 8a (see FIG. 2) in the center thereof. The bearing accommodation part 8a protrudes from the inner surface of the shaft support portion 8 and accommodates a bearing 18 whereby one end of the spool shaft 16 is rotatably supported. An attachment/detachment ring 21 is rotatably mounted to an outer peripheral surface 8b of the shaft support portion 8. The attachment/detachment ring 21 is provided for attaching/detaching the shaft support portion 8 to/from a position about the opening 5d on the first side plate 5a. The attachment/detachment ring 21 detachably attaches the shaft support portion 8 to the first side plate 5a with a heretofore known bayonet structure. The attachment/detachment ring 21 has a plurality of (e.g., three) pawls 21a and an operation knob 21b. The pawls 21a protrude radially outward from the outer peripheral surface of the attachment/detachment ring 21. The operation knob 21b is provided for performing an attachment/detachment operation. The plural pawls 21a respectively have a slope with a gradually decreasing thickness, and are engaged with a plurality of engaging grooves (not shown in the drawings) provided about the opening 5d. When the attachment/detachment ring 21 is rotated in one direction (e.g., the counterclockwise direction in FIG. 2) by downwardly operating the operation knob 21b with a fingertip, the pawls 21a are disengaged from the engaging grooves, and the shaft support portion 8 and the first side cover 6 are unlocked from the first side plate 5a. Contrarily, when the attachment/detachment ring 21 is rotated in the other direction by, for instance, upwardly operating the operation knob 21b with the fingertip, the pawls 21a are engaged with the engaging grooves, and the shaft support portion 8 and the first side cover 6 are locked to the first side plate 5a. The shaft support portion 8 is fixed to the first side cover 6 together with part of the constituent elements of the spool brake mechanism 20 by a plurality of (e.g., three) bolt members 23. In the condition that the shaft support portion 8 is fixed to the first side cover 6, the attachment/detachment ring. 21 is restricted from moving in a spool shaft direction and is rotatable with respect to the shaft support portion 8.

As shown in FIGS. 1 and 2, the thumb rest 9 includes the first bulge 9a, a second bulge 9b and a third bulge 9c. The first bulge 9a outwardly bulges from the upper part of the first side plate 5a. The second bulge 9b outwardly bulges from the upper part of the second side plate 5b. The third bulge 9c forwardly bulges, and couples the first side plate 5a and the second side plate 5b at the front part of the frame.

The handle 2 is rotatably supported by the reel unit 1. The spool 12 is rotatably held by the reel unit 1 while being disposed between the first side plate 5a and the second side plate 5b. Rotation of the handle 2 is transmitted to the spool 12 through a rotation transmission mechanism (not shown in the drawings). A clutch mechanism is mounted to an intermediate part of the rotation transmission mechanism. The clutch mechanism is capable of switching the spool 12 between an off state and an on state. In the off state, the spool 12 becomes freely rotatable. In the on state, the rotation of the handle 2 is transmitted to the spool 12.

As shown in FIG. 2, the spool 12 includes a bobbin trunk 12a and a tubular part 12b. The bobbin trunk 12a is capable of winding the fishing line thereabout. The tubular part 12b is integrated with the bobbin trunk 12a and is fixed onto the spool shaft 16. The spool shaft 16 is coupled to the inner peripheral surface of the tubular part 12b in a unitarily rotatable state. One end of the spool shaft 16 is rotatably supported by the shaft support portion 8 through the bearing 18. The other end of the spool shaft 16 is rotatably supported by the second side cover 7 through a bearing (not shown in the drawings).

<Spool Brake Mechanism>

As shown in FIGS. 2, 3, 4 and 8, the spool brake mechanism 20 includes a spool brake unit 22 and a spool control unit 24 for controlling the spool brake unit 22. The spool brake unit 22 is an exemplary spool brake.

As shown in FIGS. 2-5 and 8, the spool brake unit 22 is configured to brake the spool 12 in an electrically controllable manner. The spool brake unit 22 includes a brake magnet 44 mounted to the spool 12 in a unitarily rotatable state, a plurality of coils 46 connected in series, and a switch element 48 (see FIG. 8). The brake magnet 44 is mounted to the spool shaft 16 in a unitarily rotatable state. In the present preferred embodiment, the brake magnet 44 is bonded to the spool shall 16. The brake magnet 44 is a cylindrical magnet magnetized to have magnetic anisotropy. The plural coils 46 are disposed on the outer peripheral side of the brake magnet 44 while being aligned at predetermined intervals in a tubular arrangement. The coils 46 are attached to a circuit board 36 through a coil attaching member 47. Coreless coils are herein used as the coils 46 for preventing clogging in order to smoothly rotate the spool 12. Moreover, the coils 46 are not provided with any yoke. Wires of the coils 46 are respectively wound in a roughly rectangular shape. The wound wires are opposed to the brake magnet 44 while being disposed within the magnetic field of the brake magnet 44. Both ends of the plural coils 46 connected in series are electrically connected to the switch element 48 mounted to the circuit board 36 to be described. In the present preferred embodiment, four coils 46 are provided. Each of the coils 46 has a circular-arc curved shape, and the entirety of the coils 46 has a roughly tubular shape. The switch element 48 is implemented by, for instance, afield effect transistor. In another embodiment, the switch element 48 is another transistor, such as a bipolar junction transistor.

The spool brake unit 22 is configured to brake the spool 12 by causing the switch element 48 to switch on and off an electric current generated by a relative rotation between the brake magnet 44 and the coils 46 so as to change a duty cycle. The braking force generated by the spool brake unit 22 is strengthened with an increase in length of a switch-on time by the switch element 48 (i.e., with an increase in magnitude of the duty cycle). The switch element 48 is connected to an electric storage element 51 through a rectifier circuit 49. The electric storage element 51 is configured to store electric power generated by the coils 46 in casting. The electric storage element 51 functions as a power source configured to supply electric power to the spool control unit 24 and electric components connected to the spool control unit 24. The electric storage element 51 is implemented by, for instance, an electrolytic capacitor.

Figure 8:
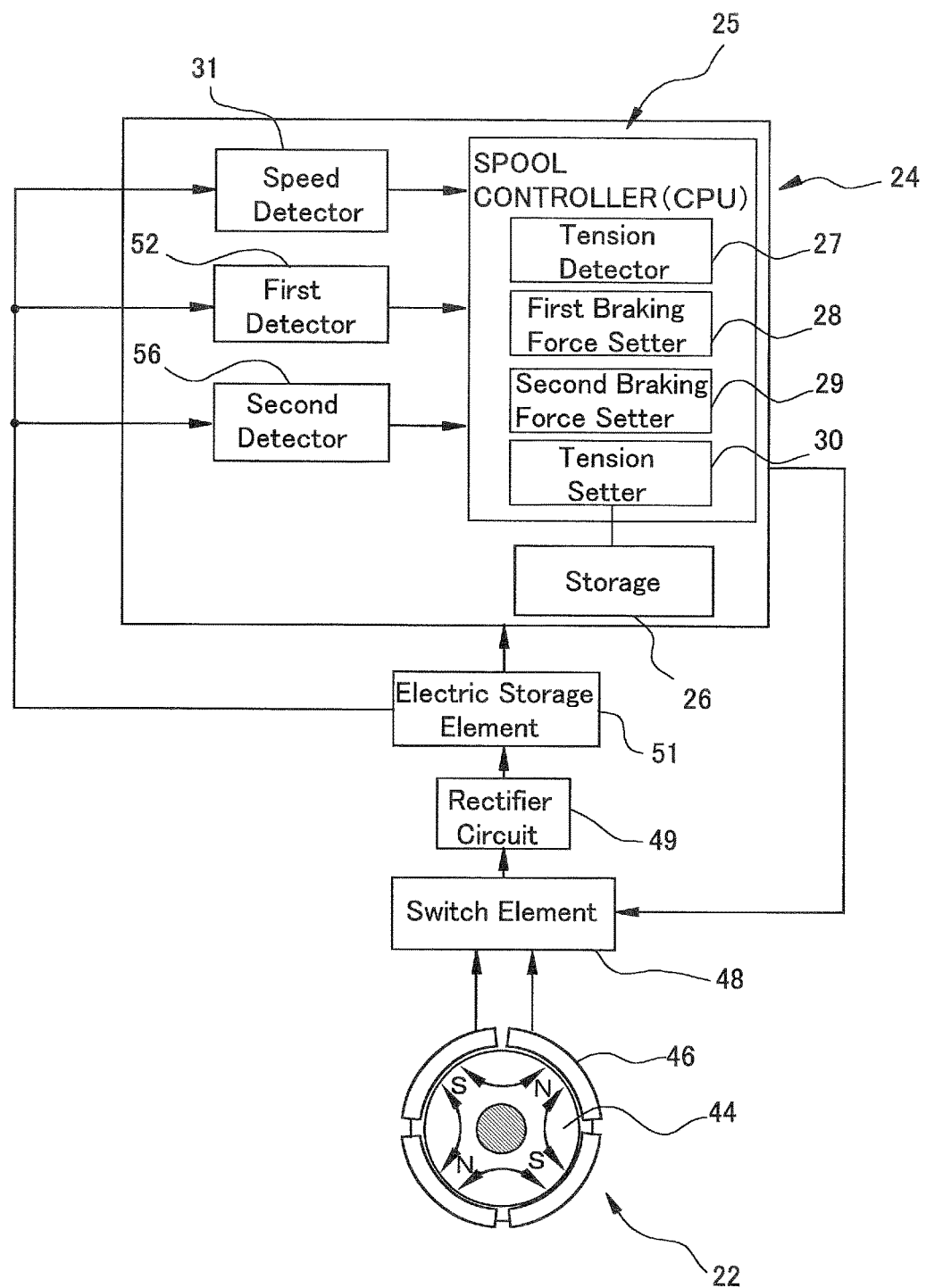
FIG. 8 is a block diagram of the spool brake mechanism.

As shown in FIG. 8, the spool control unit 24 includes a spool controller 25 and a storage 26. The spool controller 25 can be implemented by a microcomputer including a ROM, a RAM, and a CPU. In one implementation, the spool controller is implemented by a system on chip (SoC). The spool controller 25 is an example of a processing means. The storage 26 is implemented by a non-volatile memory such as an EEPROM or a flash memory The storage 26 is an example of a storing means. The spool controller 25 includes a tension detector 27, a first braking force setter 28, a second braking force setter 29, and a tension setter 30 as functional constituent elements implemented by software. In another embodiment, the tension detector 27, the first braking force setter 28, the second braking force setter 29, and the tension setter 30 can be implemented partially or entirely in hardware. The tension detector 27 is configured to detect a tension F acting on the fishing line. The first braking force setter 28 is configured to set a first braking force D1 that is used as the basis of a braking force. The second braking force setter 29 is configured to set a second braking force D2 that is used for correcting the first braking force D1. The tension setter 30 is configured to set a reference tension Fr that is used as a benchmark of tension.

The tension F can be calculated by a rate of change ($\Delta\omega/\Delta t$) of a rotational speed $\omega$ of the spool 12 and an inertia moment J of the spool 12. When the rotational speed of the spool 12 varies in casting, the rotational speed at this time is different from the rotational speed of the spool 12 independently and freely rotating without receiving a tension from the fishing line. The difference is attributed to a rotational driving force (i.e., torque) generated by the tension from the fishing line. A driving torque can be expressed with the following equation (1), where the rate of change of the rotational speed at this time is set to be ($\Delta\omega/\Delta t$).

$$T = J \times (\Delta\omega/\Delta t) \tag{1}$$

When the driving torque T is calculated by equation (1), a tension can be calculated with the radius of a point of action of the fishing line (normally 15 to 20 mm). Therefore, in the present preferred embodiment, the tension F can be detected by calculation with the rate of change of the rotational speed $\omega$.

The spool controller 25 is configured to control the first braking force D1 and the second braking force D2 by performing a duty cycle control for the switch element 48. When the tension F detected by the tension detector 27 is equal to the reference tension Fr, the spool controller 25 is configured to perform the duty cycle control with the first braking force D1. By contrast, when the detected tension F is different from the reference tension Fr, the spool controller 25 is configured to perform the duty cycle control with a braking force obtained by correcting increasing or reducing) the first braking force D1 with the second braking force D2. When determining that the second braking force D2 fluctuates with a predetermined amplitude or greater with respect to the first braking force D1, the spool controller 25 is configured to perform a decrease processing of decreasing the second braking force D2 with the elapse of time.

The storage 26 stores a plurality of data sets. In one embodiment, each of the data sets contains 15 types of data created by combinations of five braking modes (to be described) and three types of fishing line (to be described). Specifically, as to the first braking force D1, the storage 26 stores a data set containing 15 types of data regarding a rate of change D1D after casting. As to the second braking force D2, the storage 26 stores a data set containing 15 types of data regarding a maximum second braking force D2max for calculating the second braking force D2, and a data set containing 15 types of data regarding a maximum tension differential Fmax between the detected tension F and the reference tension Fr. In the present preferred embodiment, the reference tension Fr is set to be "0" and is invariable.

Figures 12, 13:
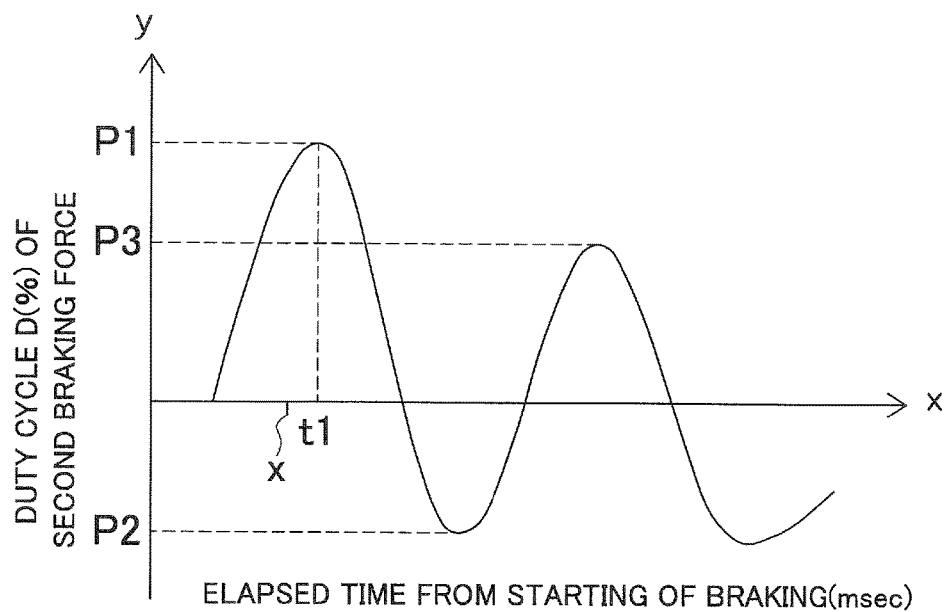
FIG. 12 is a chart for showing exemplary criteria for determining fluctuation of a second braking force.
FIG. 13 is a table for showing exemplary criteria for determining fluctuation of the second braking force in accordance with fishing line types.

Additionally, in some embodiments, the storage 26 stores a plurality of data sets regarding a first predetermined braking force y1, a second predetermined braking force y2, a third predetermined braking force y3, a predetermined elapsed time x, and a rate of decrease D2D for the second braking force D2. The first to third predetermined braking forces y1 to y3 are used by the spool controller 25 for determining that the second braking force D2 fluctuates with a predetermined amplitude or greater with respect to the first braking force D1 within the predetermined elapsed time x from casting. The rate of decrease D2D for the second braking force D2 is used in fluctuation of the second braking force D2. For example, the rate of decrease D2D is a rate of decreasing the duty cycle of the second braking force D2 by 0.5% per 10 milliseconds (msec.). It should be noted that the duty cycle of the second braking force D2 is typically not to be decreased by 40% or greater In the present preferred embodiment, a fluctuation determination is made in an automatic mode. In the automatic mode, the second braking force D2 is controllable in a wide range in accordance with a variety of factors such as the mass of a terminal tackle. Therefore, each data set herein stored in the storage 26 does not necessarily contain 15 types of data, but contains, for example, three types of data corresponding to three types of fishing line. FIG. 13 shows an example of the data sets. In this example, the predetermined elapsed time x (e.g., 100 to 250 msec.) is expressed by the elapsed time (msec.) from the starting of braking. The first predetermined braking force y1 (e.g., 25%), the second predetermined braking force y2 (e.g., −6 to 2%), and the third predetermined braking force y3 (e.g., 25%) are expressed by the duty cycle (%).

Figure 6:
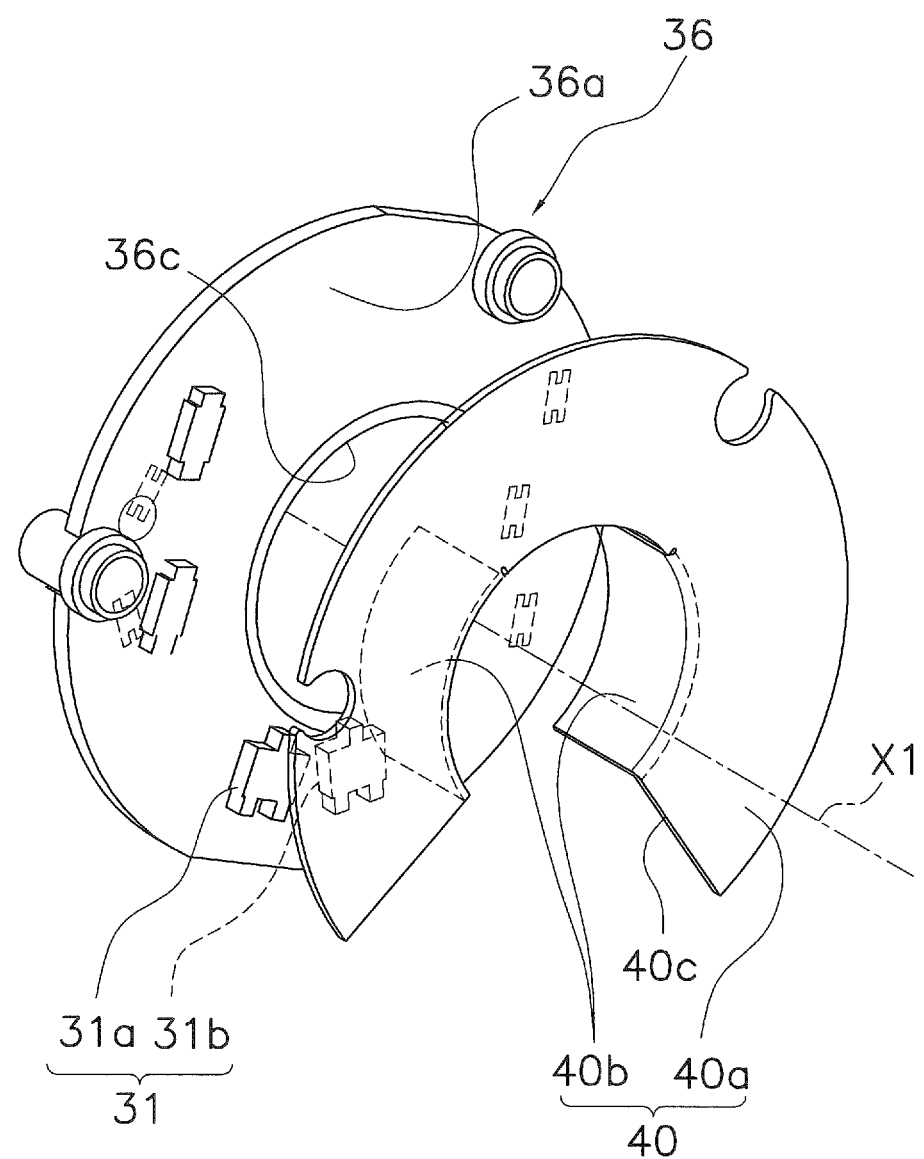
FIG. 6 is an exploded perspective view of the circuit board and a magnetic flux shielding member.
Figure 7:
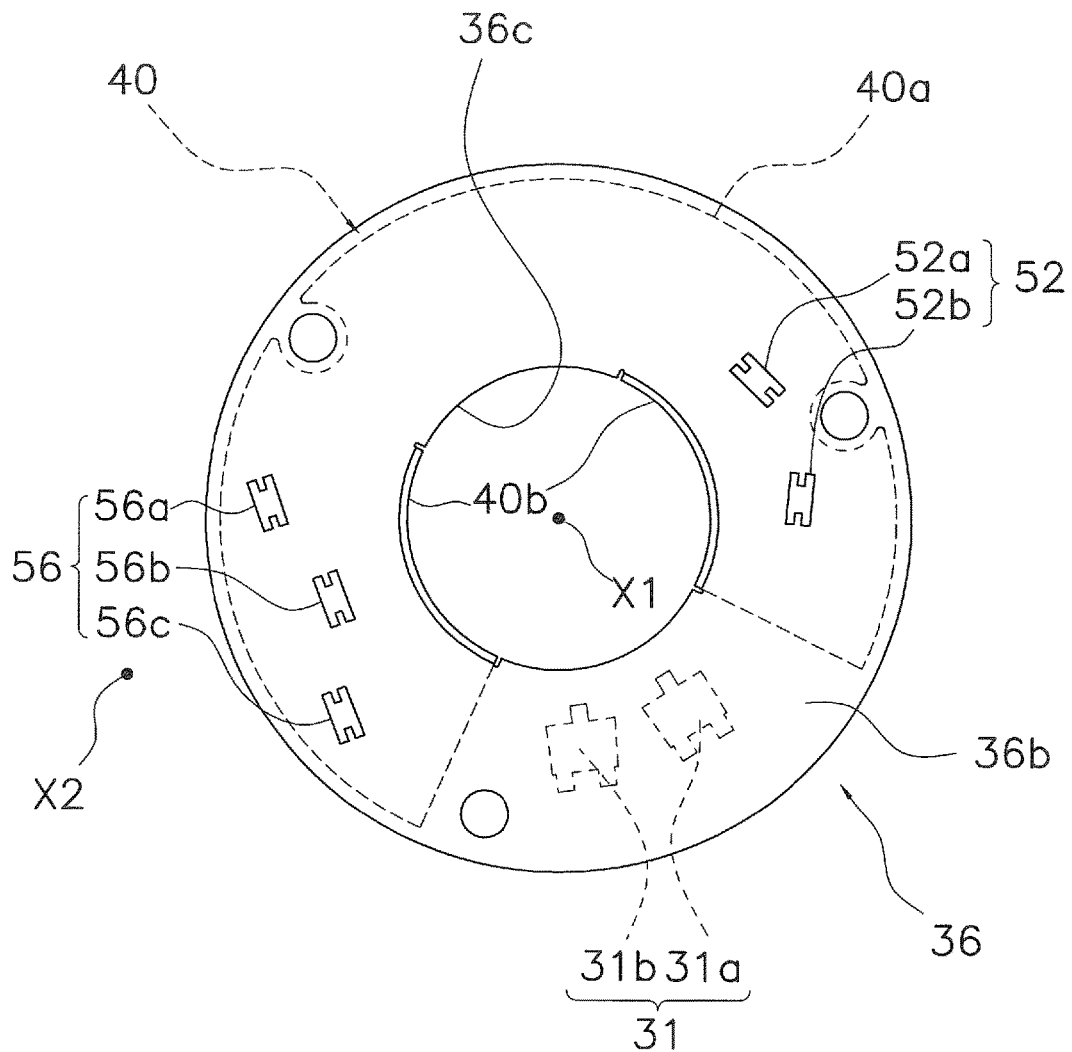
FIG. 7 is a bottom view of the circuit board seen from its second surface side.

Moreover, the spool brake mechanism 20 further includes a speed detector 31 shown in FIGS. 6, 7, and 8, the first selector 32 shown in FIGS. 2 and 3, the second selector 34, the circuit board 36, a cover member 38, and a magnetic flux Shield member 40. The speed detector 31 is provided for detecting the rotational speed ω of the spool 12 and the rotational direction of the spool 12 based on a variation in a magnetic flux of the brake magnet 44. Additionally, the tension F acting on the fishing line is also detectable as described above based on a variation in the rotational speed ω of the spool 12 with time. As shown in FIGS. 6 and 7, the speed detector 31 includes two hall elements 31a and 31b. The hall elements 31a and 31b are mounted to the inner peripheral region of a first surface 36a of the circuit board 36, while being arranged about the first axis X1 at an interval.

The first selector 32 is provided for selecting any one of a plurality of brake modes of the spool brake unit 22 in accordance with different types of fishing line. In the present preferred embodiment, for instance, one of three braking modes is selectable in accordance with different types of fishing line (e.g., nylon line, fluorocarbon line (polyvinylidene fluoride line), and PE line (polyethylene fiber thread)).

The first selector 32 includes a first selection operating portion 50 and a first detector 52 (see FIGS. 7 and 8). The first selection operating portion 50 includes at least one (e.g., two) first magnet 50a. The first detector 52 is opposed to the at least one first magnet 50a across the attachment/detachment ring 21 and is configured to detect a selection position of the first selection operating portion 50.

The first selection operating portion 50 is mounted to the reel unit 1 such that the first selection operating portion 50 is movable within a first range divided into positions corresponding to a plurality of levels. In the present preferred embodiment, the first selection operating portion 50 is rotatably mounted to the inner surface 6b of the cover body 6a such that the first selection operating portion 50 is settable in, for instance, any one of the positions corresponding to a predetermined number of levels (e.g., three) in the first range. The first selection operating portion 50 includes a lever member 50b to which the (e.g., two) first magnets 50a are mounted. The lever member 50b includes a first exposed part 50c on the tip thereof. The first exposed part 50c curves in a circular-arc shape and includes a plurality of convex parts 50d. The convex parts 50d are located on the surface of the first exposed part 50c, while being circumferentially aligned at intervals. The lever member 50b is attached to the outer peripheral surface of the first mount boss 6d such that the lever member 50b is rotatable about the first axis X1 within the first range. The first range is an angular range of, for instance, 30 degrees or less. In the present preferred embodiment, the first mount boss 6d is disposed concentrically to the spool shaft 16. Thus, the first selection operating portion 50 is rotated about the spool shaft 16. In the condition that the first selection operating portion 50 is mounted to the first side cover 6, the first exposed part 50c is exposed through the first opened part 6f while protruding therefrom. However, in the condition that the first side cover 6 is mounted to the first side plate 5a, the first opened part 6f is covered with the thumb rest 9 and thus the first exposed part 50c of the first selection operating portion 50 hides in the reel unit 1. With the construction, it is possible to avoid a situation that the regulated condition is changed against the user's intention in carrying out fishing.

As shown in FIGS. 4 and 7, the first detector 52 is disposed on an outer peripheral region of a second surface 36b of the circuit board 36, while being away from the brake magnet 44. The first detector 52 includes two hall elements 52a and 52b. The hall elements 52a and 52b are disposed on the second surface 36b such that they are opposed to the two first magnets 50a relative to the shaft support portion 8. The two hall elements 52a and 52b are disposed about the first axis X1 at a predetermined interval.

The second selector 34 is provided for selecting any one of a plurality of brake modes. The magnitude of the first braking force D1 and that of the second braking force D2 are set differently among the brake modes. In the present preferred embodiment, any one of five brake modes is selectable by the second selector 34. The five brake modes include four brake modes (Mode 1 to Mode 4) and an automatic brake mode. In the four modes, the magnitude of the first braking force D1 and that of the second braking force D2 increase in the order of Mode 1 to Mode 4. In the automatic brake mode, the braking force can be regulated in a wide range in accordance with the mass of the terminal tackle, the condition of a fishing site, and so forth. The second selector 34 includes a second selection operating portion 54 and a second detector 56. The second selection operating portion 54 includes at least one (e.g., three) second magnet 54a. The second detector 56 is opposed to the at least one second magnet 54a and is configured to detect the regulation position of the second selection operating portion 54.

The second selection operating portion 54 is mounted to the reel unit 1 such that the second selection operating portion 54 is movable within a second range divided into positions corresponding to a plurality of levels. In the present preferred embodiment, the second selection operating portion 54 is rotatably mounted to the inner surface 6b of the cover body 6a such that the second selection operating portion 54 is settable in, for instance, any one of the positions corresponding to a predetermined number of levels (e.g., five) within the second range. The second range is an angular range of, for instance, 120 degrees or less. The second selection operating portion 54 includes an operating portion body 54b and a second exposed part 54c. The operating portion body 54b is a member to which the at least one (e.g., three) second magnets 54a is mounted. The second exposed part 54c is fixed to the operating portion body 54b by, for instance, an elastic coupling. The operating portion body 54b is attached to the inner surface 6b of the cover body 6a by a screw member 55 to be screwed into the second mount boss 6e such that the operating portion body 54b is rotatable about the second axis X2. In the condition that the first side cover 6 is mounted to the first side plate 5a the second exposed part 54c is exposed through the second opened part 6g. With the construction, the position of the second selection operating portion 54 can be regulated with a fingertip of the user's hand holding the dual-hearing reel 100 on the palm in carrying out fishing.

As shown in FIG. 7, the second detector 56 is disposed on the outer peripheral region of the second surface 36b of the circuit board 36, while being away from the brake magnet 44. The second detector 56 is disposed on the second surface 36b of the circuit board 36, while being away from the first detector 52 substantially at an angular interval of 180 degrees. The second detector 56 includes three hall elements 56a, 56b and 56c. The three hall elements 56a, 56b and 56c are disposed on the second surface 36b of the circuit board 36 such that they can be opposed to the three second magnets 54a. The three hall elements 56a, 56b and 56c are disposed about the second axis X2 at intervals.

The circuit board 36 has a disc shape having a through hole 36c. The circuit board 36 is mounted to one of the surfaces of the shaft support portion 8, i.e., the surface opposed to the spool 12, and is disposed on the outer peripheral side of the bearing accommodation part 8a The circuit board 36 includes the first surface 36a and the second surface 36b. The first surface 36a is the surface to which the coils 46 are mounted. The second surface 36b is on the opposite side of the first surface 36a. The circuit board 36 is fixed to the first side cover 6 together with the shaft support portion 8, the cover member 38 and the magnetic flux shield member 40 by the bolt members 23.

Figure 5:
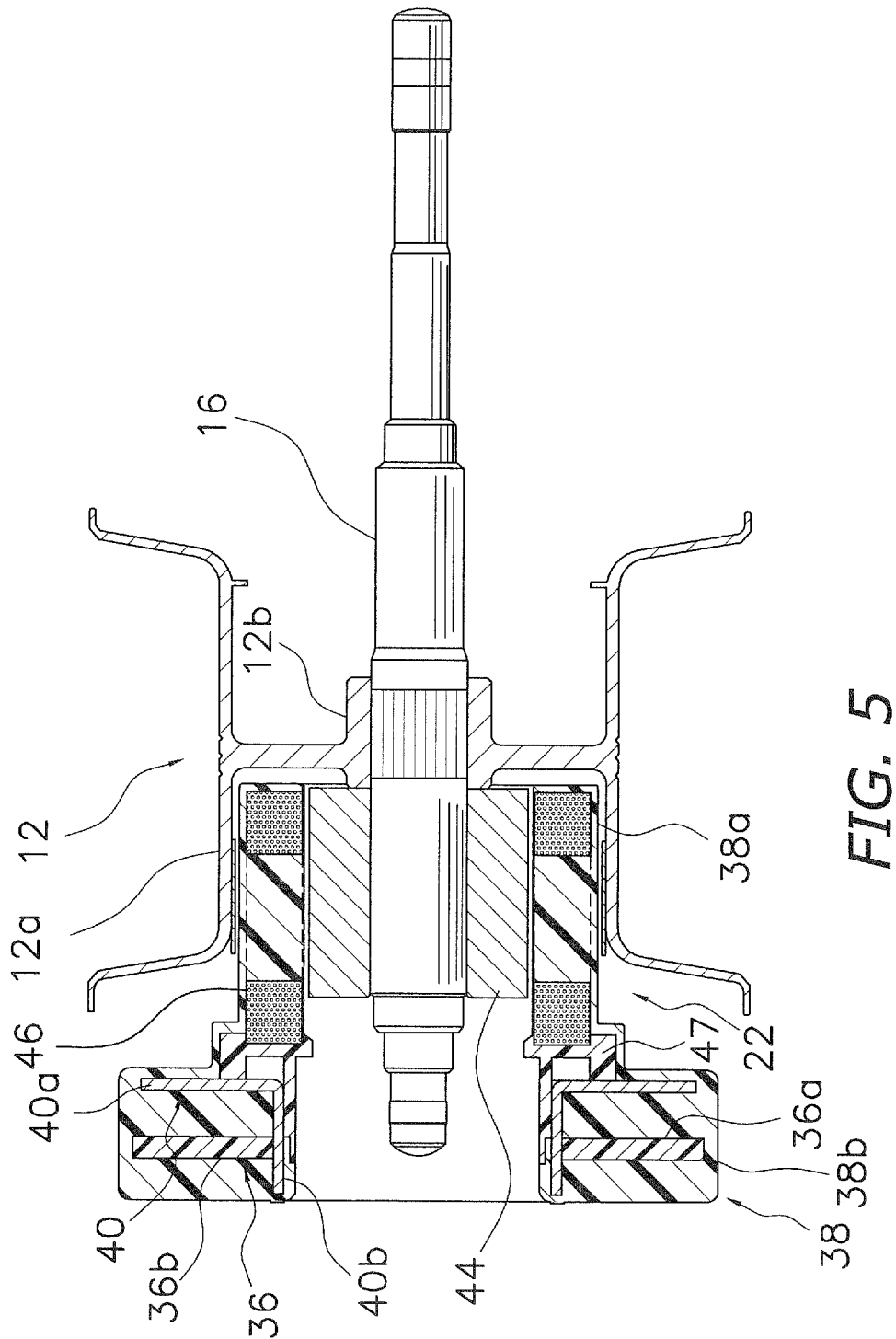
FIG. 5 is a cross-sectional view of the spool brake mechanism in a condition that a circuit board and coils are covered with a cover member.

As shown in FIGS. 2 and 5, the cover member 38 is a stepped tubular member made of synthetic resin and is provided for insulating the circuit board 36, the coils 46 and electric components mounted to the circuit board 36. The cover member 38 includes a first cover part 38a and a second cover part 38b. The first cover part 38a covers the tips, the inner peripheral parts and the outer peripheral parts of the plural coils 46. The second cover part 38b is integrated with the first cover part 38a, and covers the outer peripheral part, the inner peripheral part, the first surface 36a and the second surface 36b of the circuit board 36. The first cover part 38a is disposed on the outer peripheral side of the brake magnet 44. Put differently, the cover member 38 seals the circuit board 36 by covering the entire surface of the circuit board 36 to which the coils 46 and the electric components including the detectors are mounted. It should be noted that the cover member 38 is not shown in FIG. 4.

As shown in FIGS. 5 to 7, the magnetic flux shield member 40 is a member made of, for instance, an iron plate. The magnetic flux shield member 40 is provided for permitting the magnetic flux of the brake magnet 44 to reach the speed detector 31 but shielding the magnetic flux directed toward the first detector 52 and the second detector 56. With the magnetic flux shield member 40 herein provided, the first detector 52 and the second detector 56 can accurately detect the first magnets 50a and the second magnets 54a without being affected by the magnetic flux of the brake magnet 44. The magnetic flux shield member 40 is fixed by the bolt members 23 to the first side cover 6 together with the shaft support portion 8 and the circuit board 36 sealed by the cover member 38. The magnetic flux shield member 40 includes a first shield part 40a having, a ring shape and a pair of second shield parts 40b. The first shield part 40a is fixed to the coil attaching member 47 by, for instance, bonding. The second shield parts 40b extend from the first shield part 40a and each has a circular-arc cross section arranged about the first axis X1. The first shield part 40a is opposed to the first surface 36a of the circuit board 36 at an interval. The first shield part 40a includes a cutout 40c whereby the magnetic flux of the brake magnet 44 passes therethrough and reaches the speed detector 31 without being shielded. The cutout 40c is located in a position opposed to the speed detector 31, and is shaped such that the width thereof increases radially outward.

The pair of second shield parts 40b is located at an angular interval of 180 degrees about the first axis X1 so as to prevent the magnetic flux of the brake magnet 44 from being directed to the first detector 52 and the second detector 56. The second shield parts 40b are disposed in positions opposed to the first detector 52 and the second detector 56. The axial length of each second shield part 40b is set such that each second shield part 40b protrudes from the second surface 36b of the circuit board 36 but slightly does not reach the first side cover 6-side end surface of the cover member 38 (FIG. 5). With the construction, the magnetic flux of the brake magnet 44 is prevented from being directed to the first detector 52 and the second detector 56. It should be noted that the magnetic flux shield member 40 is covered with the cover member 38, and is thus invisible from outside.

In using a different type of fishing line from the previously used one, the spool brake mechanism 20 constructed as described above requires detachment of the first side cover 6 from the reel unit 1. Specifically, when the attachment/detachment ring 21 is rotated in one direction e.g., the counterclockwise direction in FIG. 2) by downwardly operating the operation knob 21b disposed in the rear part of the dual-beating reel 100 with a fingertip, the spool brake mechanism 20, including the circuit board 36, the first side cover 6 and so forth, is detached from the reel unit 1. This condition is shown in FIG. 3. Consequently, the first selection operating portion 50 of the first selector 32 is exposed through the first opened part 6f. This enables an operation of selecting a suitable brake mode in accordance with the type of fishing line. When this operation is finished, the spool brake mechanism 20 is closely contacted to the first side plate 5a. Then, when the attachment/detachment ring 21 is rotated in the other direction by, for instance, upwardly operating the operation knob 21b with a fingertip, the spool brake mechanism 20 is attached to the frame 5.

Next, a control action performed by the spool controller 25 in casting will be schematically explained with reference to the chart of FIG. 9. It should be noted that in FIG. 9, an elapsed time after casting is represented in the horizontal axis, whereas (a) a duty cycle indicating magnitude of braking force, (b) tension, and (c) rotational speed of the spool 12 are represented in the vertical axis. Additionally, a duty cycle actually applied in control (i.e., a braking force) is depicted with a bold solid line.

When casting is started and the spool 12 is rotated, electric power is supplied to the spool control unit 24 from the electric storage element 51, and a spool control is started. When electric power is supplied to the spool control unit 24, data are read out of the storage 26 in accordance with a brake mode selected in accordance with the operating position of the first selector 32 and that of the second selector 34, and is set in the spool controller 25. For example, the rate of change D1D of the first braking force D1 is set in the spool controller 25. Additionally, the maximum value D2$max$ of the second braking force D2 for setting the second braking force D2 and the maximum tension differential Fmax are set in the spool controller 25. Moreover, when the automatic mode is selected, the predetermined elapsed time x, the first predetermined braking force y1, the second predetermined braking force y2 and the third predetermined braking force y3, which are used for determining fluctuation of the second braking force D2, and the rate of decrease D2D used in the decrease processing for the second braking force D2 are set in the spool controller 25.

Next, the rotational speed ω is read from the speed detector 31, and the tension F is detected based on the rotational speed ω. Additionally, a first brake processing is performed by applying the first braking force D1 that increases to an initial value D1S with the elapse of time. Subsequently, a second brake processing is performed by gradually decreasing the first braking force D1 from the initial value D1S at the rate of change D1D and braking the spool 12 with the combination of the first braking force D1 and the second braking force D2 until the rotational speed ω of the spool 12 is lowered to an end speed ωe. In the second brake processing, the first braking force D1 herein decreases from the initial value MS in proportion to square of the rotational speed ω. Additionally, the second braking force D2 is set based on the preliminarily-set maximum value D2*max* of the second braking force D2, the preliminarily-set maximum tension differential Fn between the reference tension Fr and the detected tension F, and a detected tension differential between the reference tension Fr and the detected tension F at a point of time when the detected tension F has been detected by the tension detector 27.

The spool controller 25 is configured to perform two brake processings, i.e., the aforementioned first brake processing and the second brake processing to be hereinafter explained. In the second brake processing, the reference tension Fr and the detected tension F detected by the tension detector 27 are compared. When the detected tension F is different from the reference tension Fr, the spool 12 is configured to he braked with a braking force obtained by correcting (increasing or decreasing) the first braking force D1 based on the second braking force D2. The second braking force D2 is set by a product of the maximum value D2*max* and a value obtained by division of a differential between the detected tension F and the reference tension Fr by the maximum tension differential Fmax (D2=D2*max*×(F−Fr)/Fmax).

Figure 9:
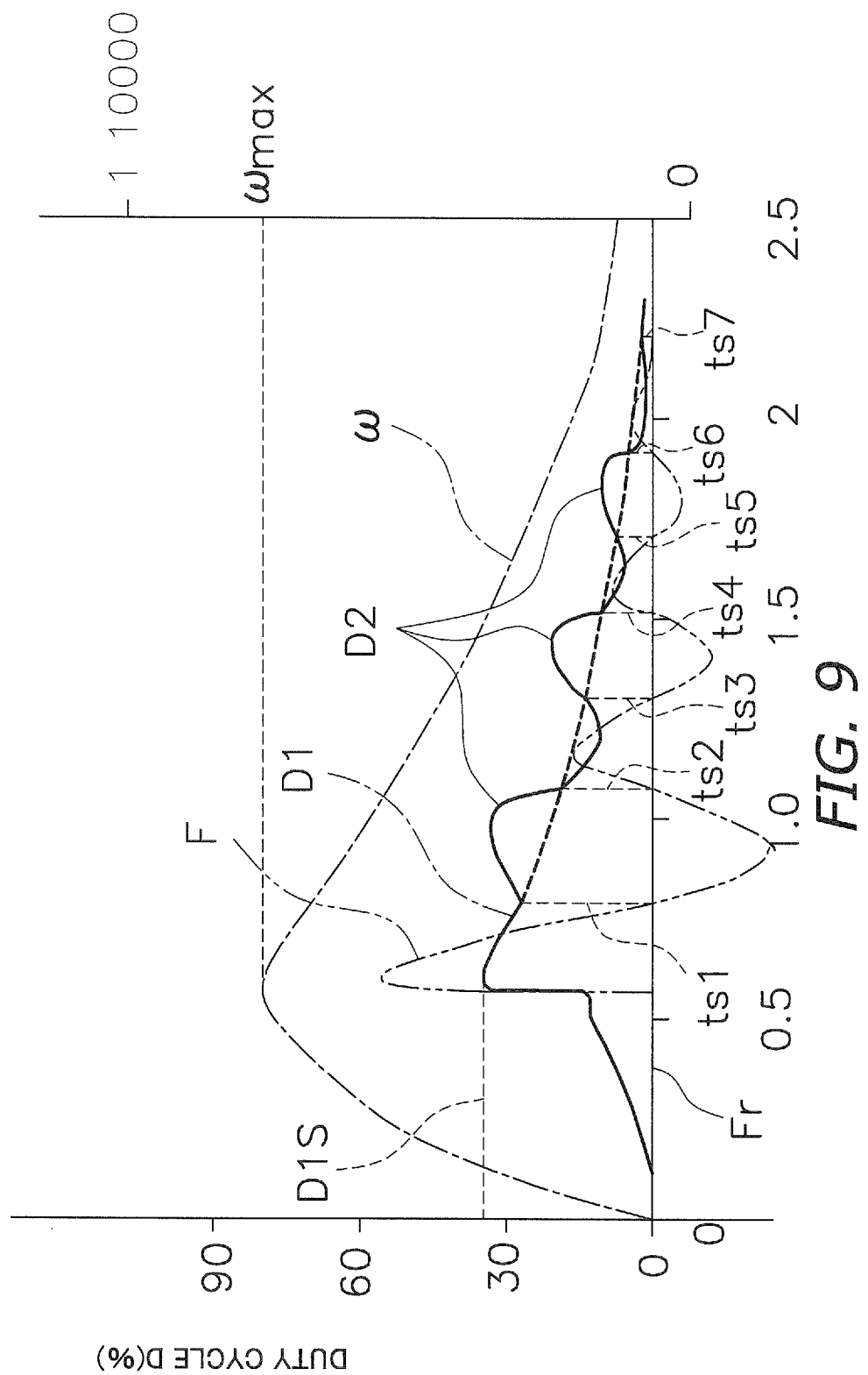
FIG. 9 is a chart for explaining a schematic brake action of a spool controller.

For example, in FIG. 9, the detected tension F is less than or equal to the reference tension Fr in a period from time ts1 to time ts2, a period from time ts3 to time ts4, and a period from time ts5 to time ts6. Hence, the spool 12 is configured to be braked with the aforementioned braking force (D1+D2) obtained by correcting the first braking force D1 based on the second braking force D2. By contrast, the detected tension F is greater than the reference tension Fr in a period from time ts2 to time ts3, a period from time ts4 to time ts5, and a period from time ts6 to time ts7. Hence, the spool 12 is configured to be braked with the aforementioned braking force (D1-D2) obtained by correcting the first braking force D1 based on the second braking force D2. When the elapsed time exceeds time ts7, the detected tension F becomes equal to the reference tension Fr. Hence, the spool 12 is configured to be braked with the first braking force D1 such that the detected tension F can converge to the reference tension Fr.

Figure 10:
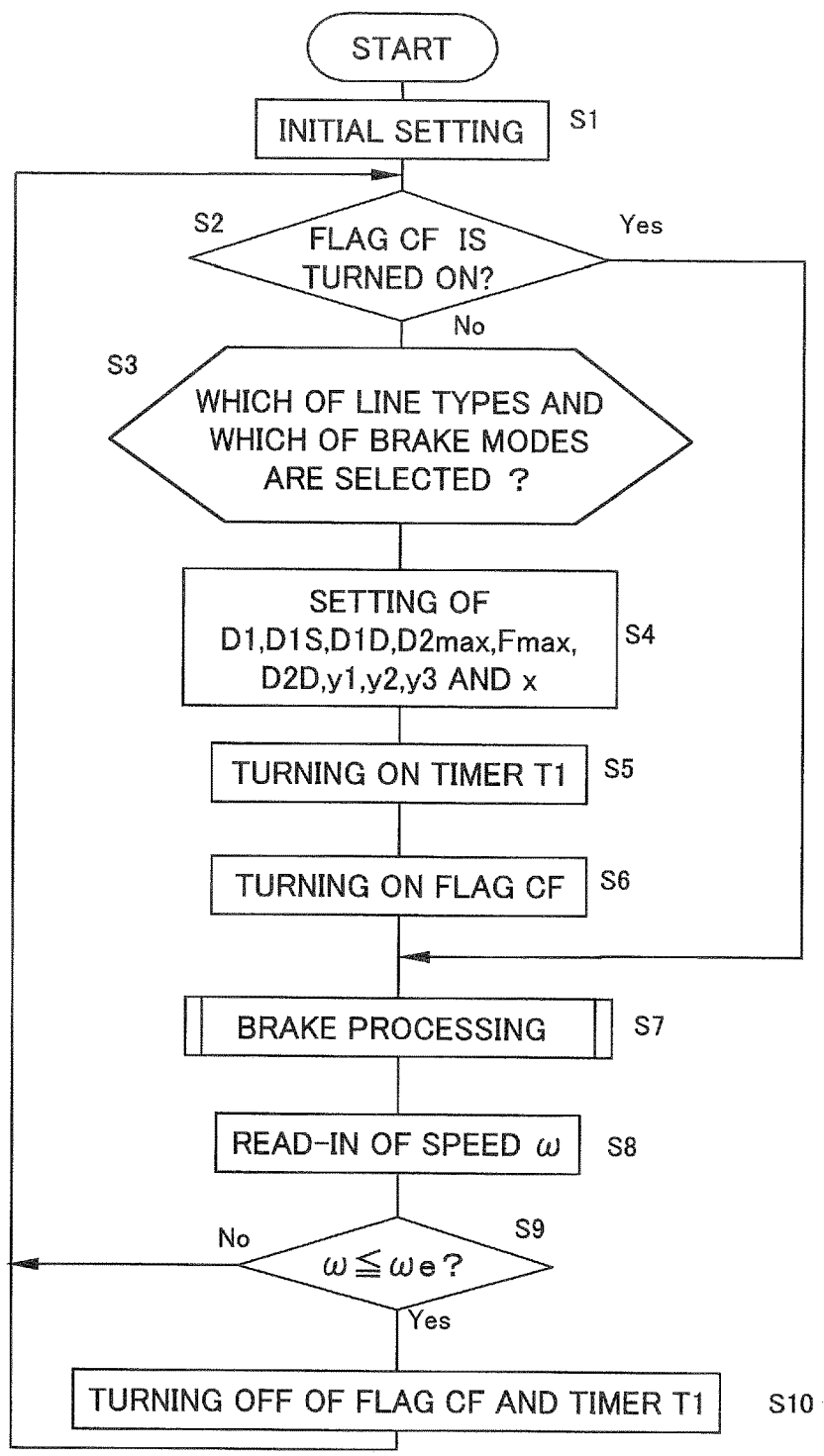
FIG. 10 is a flowchart for showing an exemplary control processing of the spool controller.
Figure 11:
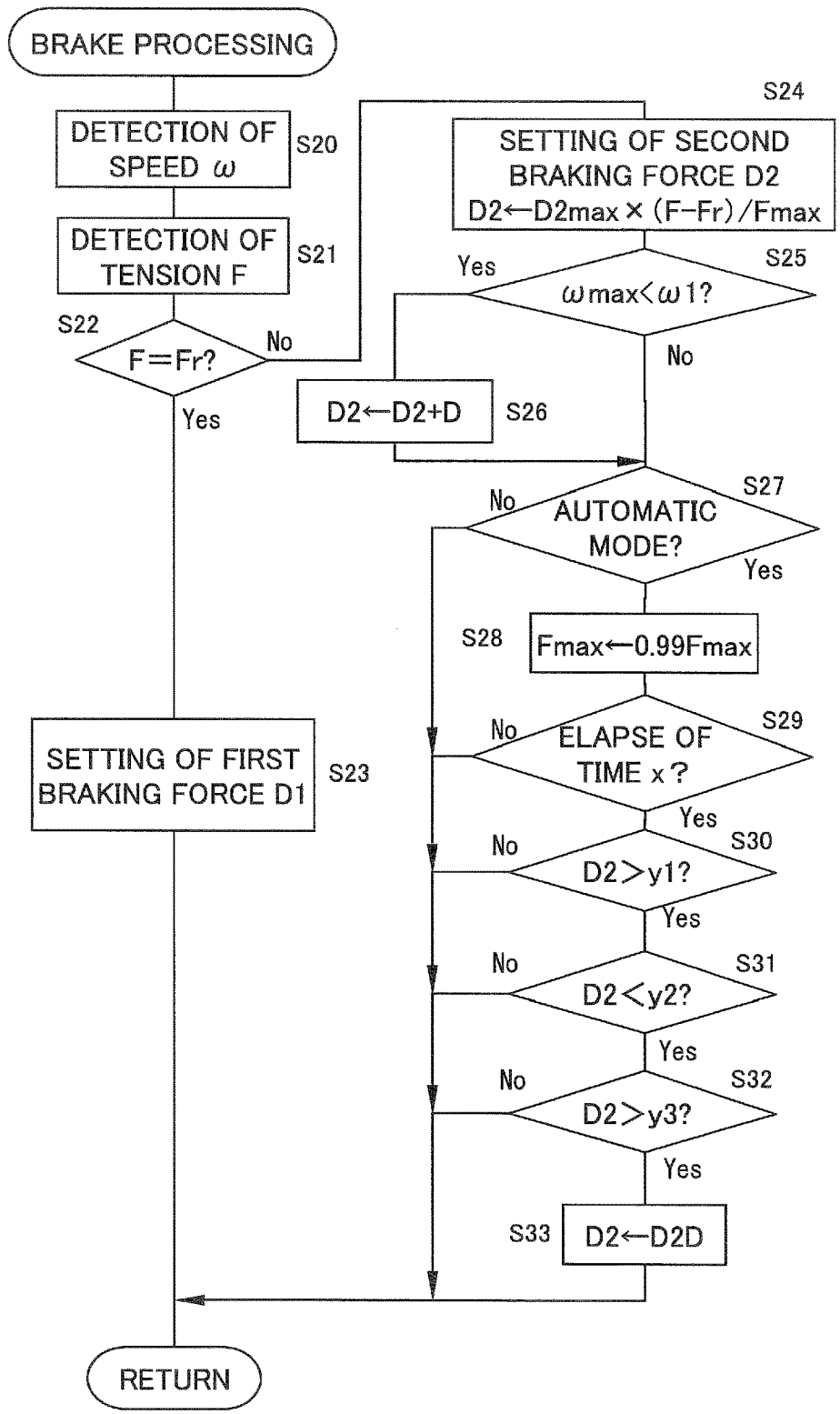
FIG. 11 is a flowchart for showing an exemplary brake control processing of the spool controller.

Next, a spool control action will be expanded based on the flowcharts of FIGS. 10 and 11. It should be noted that the control flowcharts shown in FIGS. 10 and 11 relate to algorithms for an exemplary control action, and the control action of the present specification is not limited to this.

In casting, the spool 12 is rotated, electric power is stored in the electric storage element 51, and the spool controller 25 is powered on. Under the condition, an initial setting is performed in Step S1 of FIG. 10, and then, the processing proceeds to Step S2. In the initial setting, a variety of items (e.g., a flag and a timer) and data are reset. In Step S2, the spool controller 25 determines whether or not a flag CF has been turned on. The flag CF indicates whether or not a brake processing to be described has been started. When the spool controller 25 determines that the brake processing has not been started yet, the processing proceeds from Step S2 to Step S3. Contrarily, when the spool controller 25 determines that the brake processing has been started, the processing proceeds from Step S2 to Step S7.

In Step S3, the spool controller 25 determines which one of the combinations of fishing line types and brake modes has been selected based on an output of the first detector 52 and that of the second detector 56, and then, the processing proceeds to Step S4. In Step S4, the selected fishing line type and the selected brake mode are set in the spool controller 25, and then, the processing proceeds to Step S5. In Step S4, a data set related to the first braking force D1 in accordance with the combination of the selected fishing line type and the selected brake mode, including the initial value D1 S of the first braking force D1 and the rate of change MD of the first braking force D1, is read out of the storage 26 and is set in the spool controller 25. Additionally, a data set related to the second braking force D2, including the maximum value D2*max* of the second braking force D2, the maximum tension differential Fmax, and the rate of decrease D2D of the maximum tension differential, is similarly read out of the storage 26 and is set in the spool controller 25. Moreover, another data set is read out of the storage 26 and is set in the spool controller 25, including the first predetermined braking force y1, the second predetermined braking force y2 and the third predetermined braking force y3, which are used for determining fluctuation of the second braking force D2 with a predetermined amplitude or greater within a predetermined period of time, the predetermined elapsed time x, and the rate of decrease D2D of the second braking force D2 to be used in fluctuation. It should be noted that the second braking force D2 is a duty cycle where the rotational speed in an early stage of casting is 10000 rpm. Therefore, the second braking force D2 is configured to be corrected in accordance with the rotational speed in the early stage of casting.

In Step S5, the spool controller 25 causes a timer T1 to start counting time, and then, the processing proceeds to Step S6. The timer T1 is configured to count an elapsed time from starting of braking. In Step S6, the spool controller 25 turns on the flag CF, and then, the processing proceeds to Step S7. In Step S7, the brake processing shown in FIG. 11 is performed, and then, the processing proceeds to Step S8. In Step S8, the detected rotational speed ω is read into the spool controller 25, and then, the processing proceeds to Step S9. In Step S9, the spool controller 25 determines whether or not the detected rotational speed ω has reached the end speed ωe. The end speed ωe is an extremely low speed at which the spool control is finished. When the spool controller 25 determines that the rotational speed ω has reached the end speed ωe, the processing proceeds from Step S9 to Step S10. In Step S10, the spool controller 25 turns off the flag CF and the timer T1, and then, the processing proceeds to Step S2. By contrast, when the spool controller 25 determines that the rotational speed ω has not reached the end speed ωe yet, the processing proceeds from Step S9 to Step S2. However, when casting is finished and rotation of the spool 12 is stopped, the power source voltage is lowered and the electric storage element 51 is discharged. Hence, the spool controller 25 is reset.

Referring now to the brake processing of Step S7, in Step S20 of FIG. 11, the spool controller 25 detects the rotational speed ω, and then, the processing proceeds to Step S21. In Step S21, the tension F is detected by a calculation based on the rotational speed ω, and then, the processing proceeds to Step S22. In Step S22, the spool controller 25 determines whether or not the detected tension F is equal to the reference tension Fr. When the spool controller 25 determines that the detected tension F is equal to the reference tension Fr, the processing proceeds from Step S22 to Step S23. In Step S23, the first braking force D1 is set in the spool controller 25. Accordingly, the spool 12 is braked with the first braking force D1 that decreases in proportion to the square of the rotational speed ω.

By contrast, when the spool controller 25 determines that the detected tension F is not equal to the reference tension Fr, the processing proceeds from Step S22 to Step S24. In Step S24, the second braking force D2, defined by the aforementioned equation "D2=D2*max*×[F−Fr]/Fmax," is set in the spool controller 25, and then, the processing proceeds to Step S25. The first braking force D1 is herein corrected based on the second braking force D2. For instance, the first braking force D1 is corrected by adding/subtracting the second braking force D2 thereto/therefrom, and a duty cycle herein obtained by the correction is used for braking the spool 12.

In Step S25, the spool controller 25 determines whether or not a maximum rotational speed ωmax of the spool 12 is slower than a predetermined rotational speed ω1 (e.g., in a range of 5000 to 6000 rpm). This determination step is performed for determining whether or not a type of casting such as side casting or back casting in which a fishing line is released at a relatively low speed has been performed. When the spool controller 25 determines that the maximum rotational speed ωmax is slower than the predetermined rotational speed the processing proceeds from Step S25 to Step S26. In Step S26, the second braking force D2 is increased by an increment D, and then, the processing proceeds to Step S27. The increment D is a fixed value. When the spool controller 25 determines that the maximum rotational speed ωmax is faster than the predetermined rotational speed ω1, the processing proceeds from Step S25 to Step S27. Accordingly, even when the type of casting in which the fishing line is released at a low speed is performed, line sag (a greatly loosened state of the released fishing line) is unlikely to occur because the second braking force D2 is large.

In Step S27, the spool controller 25 determines whether or not the selected brake mode is the automatic mode. When the spool controller 25 determines that the selected brake mode is not the automatic mode, the processing proceeds to Step S8 of FIG. 10. Contrarily, when the spool controller 25 determines that the selected brake mode is the automatic mode, the processing proceeds from Step S27 to Step S28. In Step S28, the spool controller 25 performs the processing of decreasing the maximum tension differential Fmax by, for instance, 1%, and then, the processing proceeds to Step S29. Accordingly, the second braking force D2 can be gradually increased with the elapse of time. When the automatic mode is selected, if the tension acting on the fishing line becomes negative and thereby line sag a loosened state of the released fishing line) occurs in a final stage of casting, tension does not become positive and it is difficult to get out of this situation. In view of the above, when the automatic mode is selected, the second braking force D2 is configured to be increased with the elapse of time in casting.

As shown in FIG. 12, when the automatic mode is selected, the second braking force D2 could fluctuate in the beginning of braking. It should be noted that in FIG. 12, duty cycle is represented in the vertical axis, whereas elapsed time from starting of braking is represented in the horizontal axis. Conditions 1 to 3 to be described are exemplary conditions for determining a fluctuation of the second braking force D2.

Condition 1 is that a first peak P1 is greater than the first predetermined braking force y1, and simultaneously, elapsed time t1 at which the first peak P1 emerges is later than the predetermined elapsed time x. Condition 2 is that a second peak P2 is less than the second predetermined braking force y2. Condition 3 is that a third peak P3 is greater than the third predetermined braking force y3.

Put differently, in a fluctuation determination, the spool controller 25 is configured to determine that the second braking force D2 has fluctuated with a predetermined amplitude or greater when the following conditions are all satisfied: the first peak P1 of the second braking force D2, emerging after elapse of the predetermined elapsed time x, is greater than the first predetermined braking force y1; the second peak P2, emerging in the opposite direction to the first peak P1 after emergence of the first peak P1, is less than the second predetermined braking force y2; and a third peak P3, emerging in the same direction as the first peak P1 after emergence of the second peak P2, is greater than the third predetermined braking force y3.

In a series of processing from Step S29 to Step S33, magnitude relations are determined between the second braking force D2 after starting of braking and braking forces including the first predetermined braking force y1, the second predetermined braking force y2 and the third predetermined braking force y3. FIG. 13 shows an example of specific numeric values used for determining the magnitude relations. FIG. 13 shows values of the predetermined elapsed time x, the first predetermined braking force y1, the second predetermined braking force y2 and the third predetermined braking force y3 with respect to three types of fishing line (F: fluorocarbon line, N: nylon line, and PE: PE line) when the automatic mode is selected.

in Step S29, the spool controller 25 determines whether or not the predetermined elapsed time x has elapsed since starting of braking. When the spool controller 25 determines that the predetermined elapsed time x has elapsed, the processing proceeds from Step S29 to Step S30. In Step S30, the spool controller 25 determines whether or not the duty cycle of the second braking force D2 is greater than the first predetermined braking force y1. When the spool controller 25 determines that the duty cycle of the second braking force D2 is greater than the first predetermined braking force y1, the processing proceeds from Step S30 to Step S31. In Step S31, the spool controller 25 determines whether or not the duty cycle of the second braking force D2 is less than the second predetermined braking force y2.

When the spool controller 25 determines that the duty cycle of the second braking force D2 is less than the second predetermined braking force y2, the processing proceeds from Step S31 to Step S32. In Step S32, the spool controller 25 determines whether or not the duty cycle of the second braking force D2 is greater than the third predetermined braking force y3. When the spool controller 25 determines that the duty cycle of the second braking force D2 is greater than the third predetermined braking force y3, the processing proceeds from Step S32 to Step S33. In Step S33, the spool controller 25 decreases the second braking force D2 at a predetermined rate of decrease, and then, the processing proceeds to Step S8 of FIG. 10. Specifically; in Step S33, the second braking force D2 is decreased at the rate of decrease D2D.

The processing proceeds to Step S8 of FIG. 10 when the spool controller 25 determines that the predetermined elapsed time x has not elapsed yet in Step S29, when the spool controller 25 determines that the duty cycle of the second braking force D2 is less than or equal to the first predetermined braking force y1 in Step S30, when the spool controller 25 determines that the duty cycle of the second braking force D2 is greater than or equal to the second predetermined braking force y2 in Step S31, and when the spool controller 25 determines that the duty cycle of the second braking force D2 is less than or equal to the third predetermined braking force y3 in Step S32.

When herein determining that the second braking force D2 has fluctuated with the predetermined amplitude or greater, the spool controller 25 decreases the second braking force D2 with the elapse of time. With the decrease processing, the fluctuation range of the detected tension F is narrowed, and this results in a resolution of a fluctuation in the second braking force D2. Consequently, the second braking force D2 can be prevented from repeatedly increasing and decreasing in a short period of time.

OTHER EXEMPLARY EMBODIMENTS

One preferred embodiment of the present specification has been explained above. However, the present specification is not limited to the aforementioned exemplary embodiment. A variety of changes can be made without departing from the scope of the present specification. Especially, a plurality of preferred embodiments and modifications described in the present specification can be arbitrarily combined on an as-needed basis.

(a) The conditions for determining a fluctuation described in the aforementioned preferred embodiment are exemplary only. Therefore, in the present specification, the conditions for determining a fluctuation are not limited to the above. For example, a fluctuation can be determined based on a variation in a rotational speed of the spool 12.

(b) In the aforementioned preferred embodiment, the first selector 32 and the second selector 34 are provided. Alternatively, at least one selector can be herein provided. Yet alternatively, the present specification is also applicable to a spool brake device that is configured to operate only in the automatic mode without being provided with any selector.

(c) In the aforementioned preferred embodiment, the reference tension Fr is fixed to "0". In the present specification, however, setting of the reference tension is not limited to the above. For example, the reference tension can be configured to gradually decrease after starting of braking. In this case, data of an initial value FrS of the reference tension Fr and data of a rate of decrease FrD of the reference tension Fr can be stored in the storage 26.

(d) in the aforementioned preferred embodiment, the brake processing is configured to be started simultaneously with powering on. In the present specification, however, timing of starting the brake processing is not limited to the above, and is arbitrarily settable.

<Features>

The aforementioned preferred embodiments can be expressed as follows.

(A) The spool brake mechanism 20 for the dual-bearing reel 100 is configured to brake the spool 12 that is rotatably mounted to the reel unit I so as to be capable of wincing the fishing line thereabout. The spool brake mechanism 20 includes the spool brake unit 22, the first braking force setter 28, the speed detector 31, the tension setter 30, the tension detector 27, the second braking force setter 29 and the spool controller 25. The spool brake unit 22 is configured to brake the spool 12 in an electrically controllable manner. The first braking force setter 28 is configured to set the first braking force D1. The speed detector 31 is configured to detect the rotational speed ω of the spool 12. The tension setter 30 is configured to set the reference tension Fr. The tension detector 27 is configured to detect the tension F acting on the fishing line. The second braking force setter 29 is configured to set the second braking force D2 that is used for correcting the first braking force D1 by increasing or decreasing the first braking force D1. The spool controller 25 is configured to control the spool brake unit 22 with the first braking force D1 when the detected tension F detected by the tension detector 27 and the reference tension Fr are equal to each other, and is configured to control the spool brake unit 22 with a braking force obtained by connecting the first braking force D1 based on the second braking force D2 when the detected tension F detected by the tension detector 27 and the reference tension Fr are different from each other. The spool controller 25 is configured to perform a decrease processing of decreasing the second braking force D2 with the elapse of time when determining that the second braking force D2 has fluctuated with a predetermined amplitude or greater.

In the present spool brake mechanism 20, when the set reference tension Fr and the detected tension F detected by the tension detector 27 are different from each other the first braking force D1 is corrected by increasing or decreasing the first braking force D1 based on the second braking force D2. Thus, a braking force greater than or less than the first braking force D1 is obtained anew At this time, when determining that the second braking force D2 has fluctuated with a predetermined amplitude or greater with respect to the first braking force D1 within the predetermined elapsed time x (of e.g., 100-300 msec.) from starting of braking, the spool controller 25 is configured to decrease the second braking force D2 with the elapse of time. With the decrease processing, the fluctuation range of the detected tension F is narrowed, and this results in resolution of fluctuation in the second braking force D2. Consequently, the second braking force D2 can be prevented from repeatedly increasing and decreasing in a short period of time.

(B) The tension detector 27 can be configured to detect the extent of lightness of the fishing line and the extent of looseness of the fishing line as the tension based on variation in the rotational speed ω detected by the speed detector 31. In this case, it is possible to detect the extent of looseness of the fishing line attributed to line sag in addition to the extent of tightness of the fishing line attributed to pulling of the fishing line. Therefore, controlling in line sag can be performed quickly and accurately.

(C) The spool controller 25 can be configured to determine that the second braking force D2 has fluctuated with the predetermined amplitude or greater when the following conditions are all satisfied; the first peak P1 of the second braking force D2 emerges after elapse of the predetermined elapsed time x from starting of braking and is greater than the first predetermined braking force y1; the second peak P2 of the second braking force D2 emerges in the opposite direction to the first peak P1 after emergence of the first peak P1 and is less than the second predetermined braking force y2; and the third peak P3 of the second braking force D2 emerges in the same direction as the first peak P1 after emergence of the second peak P2 and is greater than the third predetermined braking force y3. In this case, it is possible to reliably detect fluctuation in the second braking force D2 in a short period of time.

(D) When the detected tension F becomes a predetermined tension or less within a predetermined period of time during performing the decrease processing, the spool controller 25 can be configured to finish performing the decrease processing. In this case, tension is unlikely to be lowered.

(E) The second braking force setter 29 can be configured to set the second braking force D2 based on the preliminarily-set maximum value D2$max$ of the second braking force D2, the preliminarily-set maximum tension differential between the reference tension Fr and the detected tension F, and the detected tension differential (F−Fr) between the reference tension Fr and the detected tension F at a point of time when the detected tension F has been detected by the tension detector 27. In this case, the second braking force D2 is settable in accordance with the detected tension F without being extremely increased.

(F) Each of the first and second braking force setters 28 and 29 can be configured to be capable of setting a plurality of magnitudes for each of the first and second braking forces D1 and D2 such that the magnitudes are at least partially set differently in accordance with materials of the fishing line. The spool brake mechanism 20 for the dual-bearing reel 100 can further include the first selector 32 configured to select any one of a plurality of fishing line types made of different materials. In this case, the magnitude of each of the first and second braking threes D1 and D2 can be changed in accordance with the fishing line types. Hence, the flying distance of the terminal tackle can he prolonged under the optimal condition depending on the conditions regarding the fishing line types.

(G) Each of the first and second braking force setters 28 and 29 can be configured to be capable of setting a plurality of different magnitudes for each of the first and second braking forces. The spool brake mechanism 20 for the dual-bearing reel 100 can further include the second selector 34 configured to select any one of the combinations of the magnitudes of the first braking force D1 and the magnitudes of the second braking force D2. In this case, the magnitude of each of the first and second braking forces D1 and D2 can be changed in accordance with, for instance, the mass of the terminal tackle. Hence, the flying distance of the terminal tackle can be prolonged under the optimal condition depending on the conditions regarding the terminal tackle types or so forth.

(H) The maximum value D2$max$ of the second braking force D2 and the maximum tension differential Fmax can be set in accordance with at least either the fishing line type selected by the first selector 32 or the combination selected by the second selector 34. In this case, the maximum value D2$max$ of the second braking force D2 and the maximum tension differential Fmax can be optimally set in accordance with at least either the selected fishing line type or the selected combination.

(I) The second braking force setter 29 can be configured to set the second braking force D2 by multiplying the maximum value D2$max$ to a value obtained by dividing the detected tension differential (F−Fr) by the maximum tension differential Fmax. In this case, the second braking force D2 can be set without exceeding the maximum value D2$max$ thereof.

(J) The spool controller 25 can he configured to increase the second braking force D2 with the elapse of time by decreasing the maximum tension differential Fmax with the elapse of time. In this case, the denominator in the formula for setting the second braking force D2 decreases with the elapse of time. Hence, the second braking force D2 can be easily increased with the elapse of time.

(K) The second braking force setter 29 can be configured to increase the second braking force D2 when the maximum rotational speed ωmax detected after casting is slower than the predetermined rotational speed ω1. In this case, an occurrence of line sag can be prevented when casting is performed in a condition that the spool 12 is rotated at a low speed in order to accurately put the terminal tackle in a short distance target.

What is claimed is:

1. A spool brake device for a dual-bearing reel, the spool brake device to brake a spool, the spool rotatably mounted to a reel unit, a fishing line to be wound about the spool, the spool brake device comprising:
a spool brake configured to brake the spool in an electrically controllable manner;
a first braking force setter configured to set a first braking force;
a speed detector configured to detect a rotational speed of the spool;
a tension setter configured to set a reference tension;
a tension detector configured to detect a tension that acts on the fishing line;
a second braking force setter configured to set a second braking force, the second braking force for positively or negatively correcting the first braking force by increasing or decreasing the first braking force; and
a spool controller configured to control the spool brake with the first braking force when a detected tension detected by the tension detector and the reference tension are equal to each other, the spool controller configured to control the spool brake with a braking force obtained by correcting the first braking force based on the second braking force when the detected tension and the reference tension are different from each other,the spool controller configured to perform a decrease processing of decreasing the second braking force with the elapse of time when the second braking force has been determined to fluctuate with a predetermined amplitude or greater.

2. The spool brake device according to claim 1, wherein the tension detector is configured to detect an extent of tightness of the fishing line and an extent of looseness of the fishing line as the tension based on a variation in the rotational speed detected by the speed detector.

3. The spool brake device according to claim 2, wherein the spool controller is configured to determine that the second braking force has fluctuated with the predetermined amplitude or greater when the following conditions are all satisfied: a first peak of the second braking force emerges after the elapse of a predetermined period of time from starting of braking and is greater than a first predetermined braking force; a second peak of the second braking force emerges in an opposite direction to the first peak after an emergence of the first peak and is less than a second predetermined braking force; and a third peak of the second braking force emerges in the same direction as the first peak after an emergence of the second peak and is greater than a third predetermined braking force.

4. The spool brake device according to claim 2, wherein, when the detected tension becomes a predetermined tension or less within a predetermined period of time during the decrease processing, the spool controller is configured to finish performing the decrease processing.

5. The spool brake device according to claim 2, wherein the second braking force setter is configured to set the second braking force based on a preliminarily-set maximum value of the second braking force, a preliminarily-set set tension differential between the reference tension and the detected tension, and a detected tension differential between the reference tension and the detected tension.

6. The spool brake device according to claim 5, wherein at least one of the first and second braking force setters is configured to set a plurality of magnitudes for each of the first and second braking forces such that the magnitudes are at least partially set differently in accordance with materials of the fishing line, and
the spool brake device further comprises a first selector configured to select one of a nylon line, a fluorocarbon line, and a polyethylene fiber thread.

7. The spool brake device according to claim 6, wherein the maximum value of the second braking force and the set tension differential are set in accordance with the nylon line, the fluorocarbon line, and the polyethylene fiber thread.

8. The spool brake device according to claim 5, wherein at least one of the first and second braking force setters is configured to set a plurality of different magnitudes for each of the first and second braking forces, and the spool brake device further comprises a second selector configured to select one of combinations of the magnitudes of the first braking force and the magnitudes of the second braking force.

9. The spool brake device according to claim 5, wherein the second braking force setter is configured to set the second braking force by multiplying the maximum value of the second braking force by a value obtained by dividing the detected tension differential by the set tension differential.

10. The spool brake device according to claim 5, wherein the spool controller is configured to increase the second braking force with the elapse of time by decreasing the set tension differential with the elapse of time.

11. The spool brake device according to claim 1, wherein the second braking force setter is configured to increase the second braking force when a maximum rotational speed detected after casting is slower than a predetermined rotational speed.

12. A method implemented by a spool brake device for a dual-bearing reel, the method comprising:

detecting, with a speed detector, a rotational speed of a spool rotatably mounted to a reel unit, a fishing line to be wound about the spool;

controlling, with a spool controller, a spool brake to brake the spool with a first braking force when a detected tension that acts on the fishing line is equal to a reference tension;

controlling, with the spool controller, the spool brake to brake the spool with a braking force obtained by correcting the first braking force based on a second braking force when the detected tension and the reference tension are different from each other, the second braking force positively or negatively correcting the first braking force by increasing or decreasing the first braking force; and performing, with the spool controller, a decrease processing of decreasing the second braking force with the elapse of time when the second braking force has been determined to fluctuate with a predetermined amplitude or greater.

13. The method according to claim 12, further comprising:

detecting an extent of tightness of the fishing line and an extent of looseness of the tithing line as the tension based on a variation in the rotational speed detected by the speed detector.

14. The method according to claim 13, further comprising:

determining, with the spool controller, that the second braking force has fluctuated with the predetermined amplitude or greater when the following conditions are all satisfied: a first peak of the second braking force emerges after the elapse of a predetermined period of time from starting of braking and is greater than a first predetermined braking force; a second peak of the second braking force emerges in an opposite direction to the first peak after an emergence of the first peak and is less than a second predetermined braking force; and a third peak of the second braking force emerges in the same direction as the first peak after an emergence of the second peak and is greater than a third predetermined braking force.

15. The method according to claim 13, wherein the second braking force is set based on a preliminarily-set maximum value of the second braking force, a preliminarily-set set tension differential between the reference tension and the detected tension, and a detected tension differential between the reference tension and the detected.

16. The method according to claim 15, wherein a plurality of magnitudes for each of the first and second braking forces are at least partially set differently in accordance with different materials of the fishing line.

17. The method according to claim 15, wherein the maximum value of the second braking force and the set tension differential are set in accordance with a material of the fishing line.

18. The method according to claim 12, further comprising:

increasing the second braking force when a maximum rotational speed detected after a casting is slower than a predetermined rotational speed.

19. A non-transitory, computer-readable medium encoded with instructions that, when executed, cause a controller to perform a method for a dual-bearing reel, the method comprising:

detecting a rotational speed of a spool rotatably mounted to a reel unit;

controlling a spool brake to brake the spool with a first braking force when a detected tension that acts on the fishing line is equal to a reference tension;

controlling the spool brake to brake the spool with a braking force obtained by correcting the first braking force based on a second braking force when the detected tension and the reference tension are different from each other, the second braking force positively or negatively correcting the first braking force by increasing or decreasing the first braking force; and performing a decrease processing of decreasing the second braking force with the elapse of time when the second braking force has been determined to fluctuate with a predetermined amplitude or greater.

20. The medium according to claim 19, wherein the second braking force is set based on $$D2 = D2max - (F - Fr)/Fmax,$$

where $D2$ is the second braking force, $D2max$ is a preliminarily-set maximum value of the second braking force, $F$ is the detected tension, $Fr$ is the reference tension, and $Fmax$ is a preliminarily-set set tension differential between the reference tension and the detected tension.

* * * * *